US005370828A

United States Patent [19]

Ladyjensky

[11] Patent Number: 5,370,828

[45] Date of Patent: Dec. 6, 1994

[54] CHEMILUMINESCENT LIGHTING ELEMENT

[75] Inventor: Jacques Ladyjensky, Brussels, Belgium

[73] Assignee: Continental Photostructures SPRL, Brussels, Belgium

[21] Appl. No.: 828,318

[22] Filed: Jan. 30, 1992

[51] Int. Cl.[5] .......... C09K 3/00; F21K 2/00; B65D 25/08; B65D 35/22

[52] U.S. Cl. .......... 252/100; 362/34; 206/219; 222/94

[58] Field of Search .......... 252/700; 362/34; 206/219; 222/94

[56] References Cited

U.S. PATENT DOCUMENTS

| | | | |
|---|---|---|---|
| 3,813,534 | 5/1974 | Gilliam | 222/94 |
| 4,678,608 | 7/1987 | Dugliss | 252/700 |
| 4,798,288 | 1/1989 | Holzner | 206/219 |
| 5,029,049 | 7/1991 | Ladyjensky | 362/34 |
| 5,067,051 | 11/1991 | Ladyjensky | 362/34 |

*Primary Examiner*—Philip Tucker

*Attorney, Agent, or Firm*—Curtis, Morris & Safford

[57] ABSTRACT

A tubular lighting element is disclosed comprising two concentric tubes of translucent material, each filled with a component of a chemiluminescent composition which, when mixed, produce chemical light, wherein the inner tube contains at least one serration which causes the tube to be broken thereat when flexed.

12 Claims, 2 Drawing Sheets

CHEMILUMINESCENT LIGHTING ELEMENT

BACKGROUND OF THE DISCLOSURE

Chemiluminescent lighting elements consist of a flexible translucent tube or pipe etc. filled with liquids capable of emitting light at the start of an activation caused by bending them.

The principle and techniques for the production of such light, referred to as "chemiluminescent" are well known. They are described, for example, in U.S. Pat. No. 4,678,608.

Translucent tubes, which may or may not be compartmentalized, filled with liquids capable of supplying chemiluminescent light have existed for several years. These articles are used, in particular, as fishing lures, or for purposes of beacon signalling, decoration, amusement, or advertising.

The light is emitted when two chemiluminescent composition components, one of which is generally called the activator, are placed in contact so as to permit their mixing. It is possible to mix them and then introduce the mixture into a tube made of translucent plastic material, seal its ends and then freeze the whole so as to cause a stoppage of the chemiluminescent reaction. At the moment of use, the tube is brought back to ambient temperature and starts to emit the desired light. This known process has the merit of being simple, but has numerous disadvantages, the main one being the obligation of accompanying the element or device with a refrigerated enclosure until the time of its use.

In more common practice, a different process is used, which consists of using a tube or pipe of translucent plastic material containing the first liquid and an interior capillary glass tube containing the activator. The two liquids thus remain separated until the moment at which the user decides to carry out their mixing by simplying bending the assembly, which causes breakage of the inner glass tube and causes mixing of the two liquids, and therefore, chemiluminescent light emission.

Such devices are presently marketed on a large scale but nevertheless present various disadvantages. The biggest disadvantage lies in the necessary limitation of the length of the inner glass tube, generally one-half meter maximum. In fact, an excessively long glass tube is easily broken prematurely, either by the user, or during handling, transport or packaging, or even during manufacturing.

Furthermore, glass is not a chemically inert material with respect to the liquids to be used and over the long term, it will cause changes to the chemicals during storage. There is also a certain unfavorable prejudice against the use of glass that is to be broken, with certain users being afraid that sharp pieces may pierce the plastic outer wall and cause injury to the hands.

The limitation of the length of the glass capillary greatly complicates continuous manufacturing, whereas the outer tube could be unwound continuously during the manufacturing process.

A different technique has recently been proposed, which permits the realization of a tubular chemiluminescent lighting element containing a second plastic tube, rather than a glass tube, inside its perifery. Some of the disadvantages mentioned above regarding the use of glass are thus overcome. This technique makes use of a slide containing a cutting edge which permits a longitudinal slitting of the inner tube along its whole length; see U.S. Pat. No. 5,029,049. Unfortunately, when applying this technique, it is not possible to manufacture series of elements continuously. The slide must actually be introduced separately into each article. This disadvantage is particularly troublesome if one considers the production of relatively short tubular articles.

SUMMARY OF THE INVENTION

The present invention proposes a tubular chemiluminescent lighting element that can be obtained by cutting a very long tube of flexible, translucent synthetic material, filled with the first chemiluminescent liquid and containing a second tube of flexible synthetic material of the same length and filled with the second liquid capable of producing the chemiluminescent reaction, into pieces.

This long tubular assembly formed of two concentric tubes will thus be divided into elements of the desired length. This division is obtained by means of closures located at various places along the tube, at regular intervals or irregular intervals, followed by a division at the closed points.

Accordingly to the principal characteristic of the invention, the inner tube is provided, on its outer wall, over its whole length or over part of its length, with one or more serrations, scores, clefts notches etc. which are helical, transverse, or oblique with respect to the axis of the tubular assembly.

DESCRIPTION OF THE INVENTION INCLUDING PREFERRED EMBODIMENTS

Figure 1:
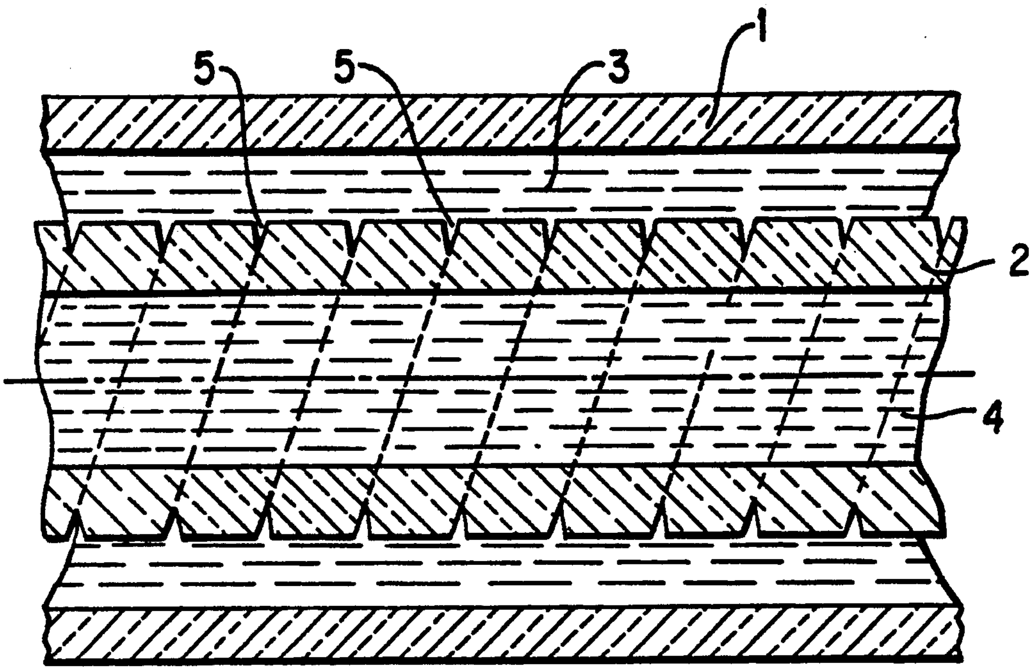
FIGS. 1–5 illustrate various embodiments of the tubular element of the present invention.

Within the framework of the present description, the term "serration" will refer to a cut, incision, notch, cleft, score, groove, fluting, rifling etc, with or without removal of material.

The serration may, however, affect a considerable part of the wall thickness, preferably varying from about 10 to about 60% of the said thickness, without ever passing through it completely. The serration may be imparted to the tube, for example, during the manufacturing process by means of a knife or a cutting element. As a preferred execution, one may impart a helical notch, over the whole length of the tube, which appears in the manner of a threading and is applied by a technique analogous to that used for threading.

When the user wishes to activate the device to create the chemiluminescent light, it is sufficient to bend the tubular element in a manner similar to that which would be used with a device containing a glass inner tube. The plastic inner tube breaks, releasing its contents and thus causing mixing with the component contained in the outer tube.

The very important advantage presented by the present invention, as compared with the use of glass, is that the notching can be carried out over the entire length of the inner tube, particularly continuously, after which the said tube is inserted into the outer tube, also over a long length. As for the filling of the two tubes with the liquid components, this can also be carried out over a very long length, in a single operation and even possibly for both liquids at the same time. To obtain the lighting elements in an industrial quantity i.e., in a very large number, it is sufficient to divide or cut up the long bi-tubular assembly, by applying a closing (sealing)

operation to it from place to place, such as by the application heat, accompanied by a cutting operation.

The synthetic materials which may be used for the inner and outer tubes, pipes etc., and which can be identical or different, are preferably thermoplastic materials, i.e., materials capable of softening reversibly or of melting under the action of heat. For the inner pipe, tube etc., one preferably uses a poly (olefin terephthalate) such as materials of the PET [poly(ethylene terephthalate] family. These materials are sufficiently tight and inert with respect to chemiluminescent liquids and are well known to those skilled in the art. Polypropylene can also be used, provided it is of a sufficient wall thickness. A polyolefin such as polyethylene or polypropylene, or also a polyester such as PET, preferably homopolymeric PET, may be suitable for the outer pipe, tube etc.

According to a specific embodiment, one uses an inner tube etc. consisting of a material of the PET family, coextruded on both of its surfaces or one of its surfaces with a layer of polyolefin. This configuration improves the sealing compatibility by fusion in the hot state with the polyolefin of the outer tube and also improves the chemical inertness of the PET of the inner tube with respect to chemiluminescent liquids.

An article according to the invention, suitable for use as a diversion (necklace, headband, bracelet), may exist, for example, in the form of a tubular assembly containing an inner tube with an outside diameter of e.g. 2.7 mm and an inside diameter of e.g. 1.7 mm. The outer surface of this tube is provided with a helical incision whose pitch is about 2 mm, with the incision having a depth of e.g. about 0.30 mm. The said inner tube, about 50 cm in length, is contained in an outer tube of identical length and integral at both ends, closed by overmolding, with an outside diameter of e.g. 6 mm and an inside diameter of e.g. 4 mm. The inner tube is made of poly-(ethylene terphthalate) such as sold by the designation PETD, Arnite® D04-300 by Akzo and contains an 85% solution of hydrogen peroxide in dimethyl phthalate and a catalytic quantity of catalyst such as sodium salicylate. The outer tube is made of polyethylene such as sold under the designation DSM® by Stamylon LD. The annular space between the two tubes is occupied by a solution of a chemiluminescent compound such as bis(2,4,5-trichloro-6-carbopentoxyphenyl) oxalate and a a fluorescer in dibutyl phthalate.

The invention also proposes several processes for continuously carrying out the sealing and cutting operations, giving rise each time to the production of a finished lighting element, such processes being particularly economical and suitable for industrial production.

According to a particularly preferred embodiment, the continuous serration of the inner tube is obtained by using a rotating knife blade, which is placed obliquely with respect to the axis of the knife. As the inner tube is subjected to the action of the rotating knife, the tube receives longitudinal push along its axis which can be used advantageously for the introduction of the resultant serrated tube into the outer tube.

Once the inner tube is inserted into the outer tube over its whole length, the tubes are filled with the liquid that each will contain. These two fillings can be carried in a manner known to to those skilled in the art.

After the fillings are complete, the assembly of the two coaxial tubes can be cut into desired lengths, each length providing an individual lighting element.

For this purpose, as indicated above, closures or seals will preferably be made along the tubular assembly at distances that will depend on the desired length of the chemiluminescent elements. In practice, one can thus carry out production runs of a large series of identical length devices. It should be understood however, that the said length can also be modified during manufacture.

One of the proposed methods for producing the closures or seals comprises passing the bi-tubular assembly into a station where it will stop for an instant to receive, by overmolding in a suitable small mold, a deposit of thermoplastic material whose overmolding temperature is sufficiently high to strongly soften the materials of which the tubes are made, thus forming, after cooling, a block serving as a plug.

To prevent, in certain cases, a weakening of the tubular assembly at the point at which the overmolding will be carried out, the serration of the inner pipe may be interrupted in the zones that are intended to be provided with overmolding. However, this embodiment is most frequently unnecessary.

It is oftimes worthwhile and preferable not to conduct the overmolding directly on the tubular assembly containing the two chemiluminescent component at the point of closure. Thus, before passing into the overmolding station, the tubular assembly first passes into a station or work position where it is subjected to a local pressing or constricting action, which eliminates the presence of liquids from the zones to be closed. These liquids are then, in effect, held back on both sides of the zone to be closed. One thus eliminates the presence of these liquids at the seal site so as to prevent impairment of the effectiveness of the overmolding.

The pressing or constricting action can be obtained, for example, by heating the tubular assembly at the zone in question, followed by a centripetal action of compressed air on the said zone, followed finally by a cooling. These operations can take place in the same station or in two or more successive stations.

The pressing, accompanied by compressed air, may be carried out in a rigid tube closed at the entrance and exit by a toric joint permitting sliding of the tubular assembly or in an equivalent device.

The same effect can also be obtained with rubber parts or with a cylindrical rubber membrane receiving a hydraulic thrust, or by using metal pliers.

According to another variation, this conformation is obtained by operating in the cold, without reheating.

These various forms of execution of the constriction are greatly dependent on the nature of the materials selected for the walls of the tubular assembly.

In certain cases, an analogous result can be obtained by carrying out a pressing, not in the form of a symmetrical constriction of every part of the tubular assembly, but by a simple crushing, which locally flattens the assembly renders it devoid of liquids at the point at which it will receive the overmolding. This solution is particularly suitable for tubular assemblies of small diameter.

According to the above-mentioned embodiments, the material that is injected to carry out the overmolding must, in principle, be hot enough to cause local fusion of both the material of the outer tube and that of the inner tube, so as to obtain a good seal which will not leak.

It is also possible to avoid working with the material injected at very high temperature. Thus, before being provided with the overmolding and after having undergone its pressing or constriction, the tubular assembly may be the object of a cut consisting of the removal of a small section of the assembly at the point at which the overmolding will take place, said section of a size less than that required for the overmolding. The overmolded material can thus not only locally surround the tubular assembly itself, but can also penetrate up to the geometric axis of said assembly at the point at which it is interrupted. The overmolding material thus seals the assembly without having to be used at a sufficiently high temperature to cause local fusion of the two cut ends of the coaxial tubes. It acts as a cap surrounding the interrupted end of the tubular assembly at this point.

At a subsequent station, the overmolded block undergoes a final transverse cut at the point at which the small section of tubular assembly had been removed and where the overmolding materials has been able to reach the geometric axis.

To remove the small section of the above-mentioned tubular assembly at the point at which the overmolding will take place, one can use, for example, a double knife apparatus which also mechanically removes the small section of assembly cut therefrom and found between the two blades. One can also reheat the tubular assembly at this point and carry out a longitudinal traction, so as to pull the closed zone into two parts. This latter process can be carried out by passage of the overmolded block of the tubular assembly into a tight and heated metal tube and injection of compressed it into the chamber thus formed.

Another possible variation for obtaining the string of closures or seals comprises passing the tubular assembly into a station where it stops for an instant to receive, in an appropriate small chamber, a flow of heat capable of melting the walls of the assembly. At the same time, the tubular assembly is subjected to an axial push, which shortens it by compacting the fused material until it forms a plug by fusion of the walls. The liquids are then held back in the tubes outside the sealed zone.

This operation is followed by cooling of the said fused plug, a cooling which can take place either in place in the same station, or in the next station arrived at by the passage of the tubular assembly. Then, as in the other embodiments, a transverse cut is carried out on the tubular assembly at the point of the plug thus formed. A knife, a saw, or another equivalent means may be used for this purpose. According to a variation of this embodiment, it is possible to separate the individual devices by simply twisting the tubular assembly along its axis at the moment the cooling of the fused plug starts, which will cause the plug to break at its center under the action of this rotation, preferably under traction.

According to yet another embodiment for obtaining the string of closures, there will be located, at each point where a closure is desired, a ring of metal or other crimpable material which is crimped and crushed by an essentially centripetal action such as to strongly and permanently constrict the tubular element at this point. The placement of the rings can be carried out continuously by passage of the tubular assembly into an appropriate work position. The tubular assembly may also penetrate directly into a metal tube where rings will be removed therefrom in place by a cutting carried out immediately before the crimping operation. After crimping, the tubular assembly may pass into a subsequent station where the exiting ring is cut at its center.

The overmoldings referred to above can be provided with any impression that will give the molded mass a specific form that can be used, for example, for the hanging of the lighting element by the final user. Forms such as hooks, rings, etc. can be applied. The mold may also contain a logo or a decorative design that can be transferred to the overmolding material of the lighting element.

The invention will be better understood by an examination of the attached drawings, provided solely as examples, in which:

FIG. 1 represents a longitudinal section of a segment of a bi-tubular element, with the outer tube 1 containing a liquid 3 and the inner tube 2, whose outer wall is serrated with continous helical serration 5, being coaxial with tube 1 and containing a liquid 4.

Figure 2:
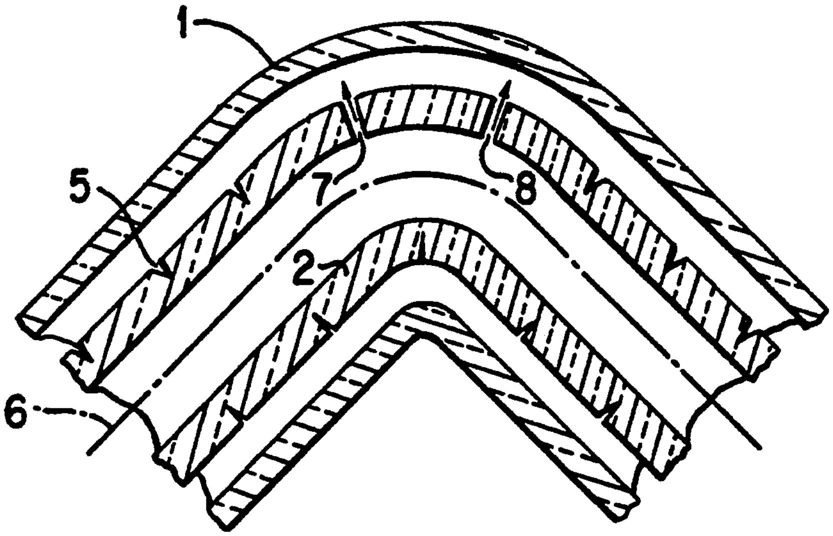

FIG. 2 represents a segment as described in FIG. 1, which has been bent along axis 6 and wherein the serration has been extended at 7 and 8, by the bending action, through the whole thickness of the wall and thus readily permits the passage and mixing of the liquids 3 and 4. Beyond a certain angle, the bending generally leads to further rupture of the inner tube and, therefore, to the complete activation of the chemiluminescent device.

Figure 3:
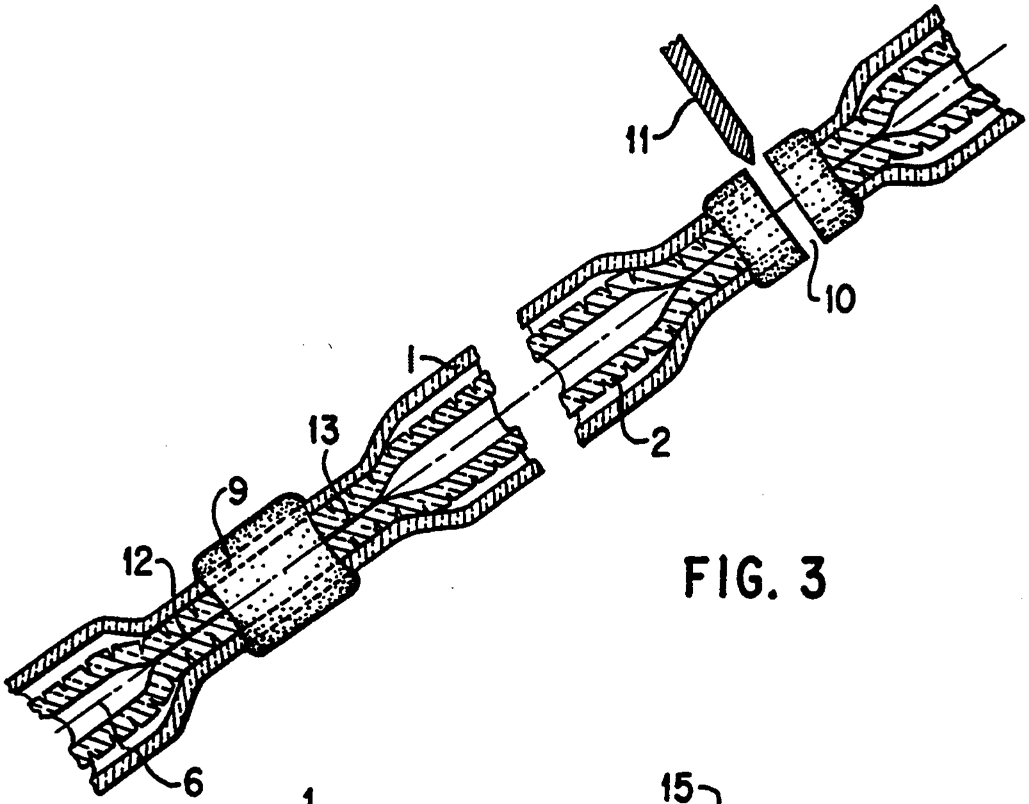

FIG. 3 illustrates the overmolding operation for a segment as described above in FIG. 1, in which a seal has been produced with a removal of liquid material. The area in which the seal is provided, selected as a function of the desired length, is compressed or constricted at 12 and 13 and the overmolding material 9 covers part of the said area. The overmolding material is cut at 10 by knife 11.

Figure 4:
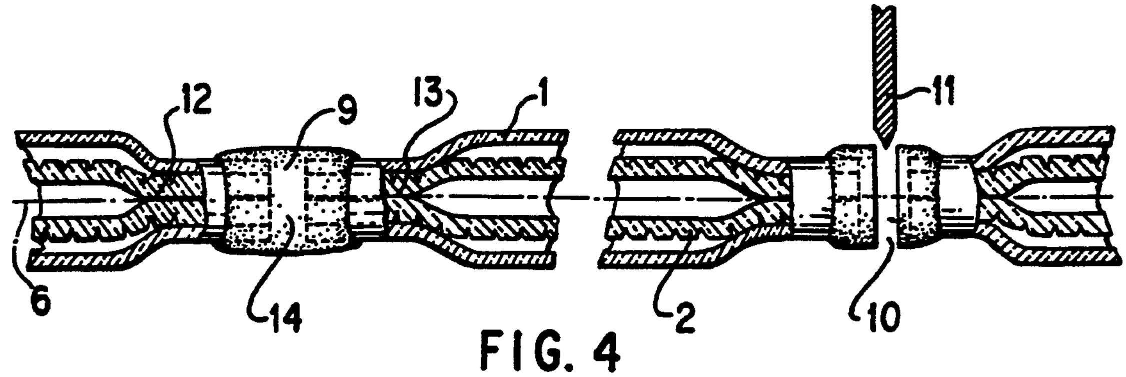

FIG. 4 illustrates a variation of the closing process, in which the tubular assembly has been compressed and constricted at 12 and 13, part of the assembly has been removed at 14, and the overmolding material 9 has been added and therefore covers the longitudinal axis of the tubular assembly. Knife 11 also divides the plug at 10 to provide discrete tubular elements.

Figure 5:
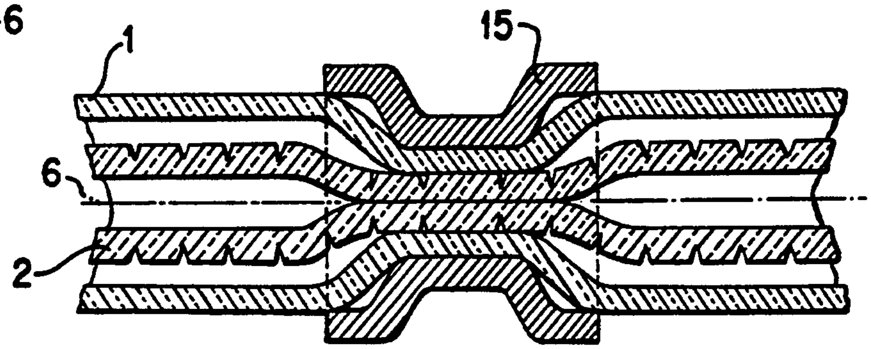

FIG. 5 illustrates another variation, in which a metal element 15 is crimped around the tubular element and can later be divided transversely at its center to provide the chemiluminescent elements of the desired length.

It is apparent that the device according to the invention, can be applied to uses other than the production of chemiluminescent light. The materials contained in the two tubular compartments can show various other useful applications and can, in particular, be capable of producing, on the occasion of their mixing, heat, cold, a glue etc. for immediate use or any other physical or chemical effect.

The invention is not limited to the embodiments illustrated, which can therefore vary in their details or structure without going beyond the scope of the present invention.

We claim:

1. A tubular element comprising two concentric tubes of flexible, translucent material each having an outer wall and different diameters thereby defining two compartments, each compartment filled with a liquid, said element being closed at each of its linear ends, characterized by the fact that the inner tube has, on its outer wall, a serration through a portion thereof never completely passing through it.

2. A tubular element according to claim 1, characterized by the fact that the serration is transverse, helical or oblique with respect to its longitudinal axis.

3. A tubular element according to claim 1, characterized by the fact that the two liquids are capable, upon being mixed, of producing chemiluminescent light.

4. A tubular element according to claim 1, characterized by the fact that the serration penetrates into the outer wall of the inner tube, to a distance varying from about 10 to 60% of the wall thickness.

5. A tubular element according to claim 1, characterized by the fact that the inner tube is made of a material of the PET family.

6. A tubular element according to claim 1, characterized by the fact that the inner tube is made of poly(ethylene terephthalate).

7. A tubular element according to claim 1, characterized by the fact that the inner tube is made of a material of the PET family and is co-extruded over one or both of its surfaces with a layer of polyolefin.

8. A tubular element according to claim 1, characterized by the fact that the outer and inner tubes are integral at their closed ends.

9. A tubular element according to claim 1, characterized by the fact that the closed ends of the element contain an overmolded material.

10. A tubular element according to claim 1, characterized by the fact that the closed ends of the element contain a crushed or crimped metal ring.

11. A tubular element according to claim 1, characterized by the fact that the inner tube contains an oxalate and a fluorescer and the outer tube contains a peroxide.

12. A tubular element according to claim 1 wherein the outer tube additionally contains a second serrated, inner tube whose rupture characteristics are identical to, or different from those of the first inner tube.

* * * * *